United States Patent
Novick et al.

(10) Patent No.: US 7,693,886 B1
(45) Date of Patent: Apr. 6, 2010

(54) DELTA QUERY TECHNIQUE

(75) Inventors: Yoram Novick, Cupertino, CA (US); Erez Webman, Tikva (IL); Orly Devor, Zichron Yaakovv (IL)

(73) Assignee: NetApp, Inc., Sunnyvale, CA (US)

( * ) Notice: Subject to any disclaimer, the term of this patent is extended or adjusted under 35 U.S.C. 154(b) by 312 days.

(21) Appl. No.: 11/640,019

(22) Filed: Dec. 15, 2006

(51) Int. Cl.
*G06F 7/00* (2006.01)

(52) U.S. Cl. .................. 707/614; 707/625; 707/629

(58) Field of Classification Search .............. None
See application file for complete search history.

(56) References Cited

U.S. PATENT DOCUMENTS

| | | | | |
|---|---|---|---|---|
| 5,873,098 | A * | 2/1999 | Bamford et al. | 707/203 |
| 6,016,489 | A * | 1/2000 | Cavanaugh et al. | 707/8 |
| 6,078,930 | A * | 6/2000 | Lee et al. | 707/202 |
| 6,161,145 | A * | 12/2000 | Bainbridge et al. | 709/246 |
| 6,298,345 | B1 * | 10/2001 | Armstrong et al. | 707/8 |
| 6,604,118 | B2 | 8/2003 | Kleiman et al. | |
| 6,836,832 | B1 | 12/2004 | Klinkner | |
| 7,251,655 | B2 * | 7/2007 | Kaler et al. | 707/9 |
| 2003/0097381 | A1 * | 5/2003 | Detweiler et al. | 707/201 |
| 2006/0089951 | A1 * | 4/2006 | Factor et al. | 707/200 |

OTHER PUBLICATIONS

Klinkner, et al., "Namespace and Storage Management Application Infrastructure For Use In Management Of Resources In A Storage System Environment", U.S. Appl. No. 11/414,593, filed Apr. 28, 2006.

* cited by examiner

*Primary Examiner*—John R Cottingham
*Assistant Examiner*—Nirav K Khakhar
(74) *Attorney, Agent, or Firm*—Cesari and McKenna, LLP (57) ABSTRACT

A delta query technique transmits only latest changes to data of objects from a server to one or more clients in response to a client query (request) to access the object data. A global counter is maintained for all of the objects served by the server. Every time the data of an object changes, a value of the global counter increments (updates) and the updated global counter value is then assumed ("inherited") by that object. In addition, the global counter is updated when a client issues a request to access one or more objects. If the data of the objects has changed since the last time the client accessed the objects, the server responds with the latest object data and the updated global counter value. Notably, each client maintains a local counter having a value that, upon receipt of the latest object data, is modified to reflect the updated global counter value.

26 Claims, 4 Drawing Sheets

DELTA QUERY TECHNIQUE

FIELD OF THE INVENTION

The present invention relates to storage systems and, more specifically, to reducing the amount of data transferred between one or more clients and a server of a storage system.

BACKGROUND OF THE INVENTION

A storage system is a computer that provides storage services relating to the organization of information on writeable persistent storage devices, such as disks. The storage system may include a software component that functions as a server to manage and maintain up-to-date (current) information about the system. The information maintained by the server can be modeled as a set of objects, each of which contains a set of properties. Objects may be added or removed from the system, and the values of their properties may change over time.

The storage system may be further configured to operate according to a client/server model of information delivery to thereby allow many clients to access the objects served by the system. In this model, the client may comprise a software component, such a graphical user interface (GUI) process, executing on a computer that "connects" to the storage system over a computer network, such as a point-to-point link, a shared local area network, a wide area network that may span long distances or a virtual private network implemented over a public network, such as the Internet. Each client may request the services of the server by issuing object access queries or requests to the storage system.

In response to a client issuing a request to access (e.g., read) the data of one or more objects, the server may send a latest image of the data for all of the objects. Depending on the number and type of objects, this could represent a substantial amount of data that consumes a substantial amount of resources (e.g., processor, memory and/or storage) on the storage system and on the network (bandwidth). In the latter case, the available bandwidth in the network may be limited and its usage may be expansive, while the latency of the network may be high (especially for long distances). Each client may disconnect and reconnect (either shortly thereafter or after a long pause), or never reconnect. Often the server may not know whether or when the client may reconnect. A disconnection may not necessarily be an orderly one, and may include an unplanned outage in the network, a failure in the client, etc.

Armed with the latest image of the object data, the client constructs a local copy of the information, including all existing objects and their relationships in the system, and may display this information to a user via, e.g., an associated GUI display. In response, the user may perform various filtering and navigation operations on the information in a local, high-responsiveness fashion, without requiring interaction with the server. The user typically expects the displayed information to be current, such that if new objects are is added (e.g., by a different client) or changed, the client reflects such additions or changes in a timely manner (e.g., 10 seconds). Accordingly, a basic implementation could be for the client to query the server, e.g., on the order of every 10 seconds, for the entire information about the objects and their structural properties. Since the number of objects is large, this would lead to excessive and impractical network utilization.

Since the server manages and maintains all information, some systems are configured such that the server performs most of the logic needed for each client to interact with its user. The server may even dictate the manner in which the information is presented on the display associated with the client. Although such configurations may lead to efficient network utilization, they may also overload the server with GUI related operation processing that may, in turn, cause a scalability bottleneck. Furthermore, various GUI operations may be slow and/or lengthy due to inherent network latency, resulting in adverse (degraded) user interaction/responsiveness.

A different approach may offload such operation processing from the server to the client. Typically, this requires that the server propagate some portion of its managed information to the client via the network. The advantages of this approach include offloading of the processing effort and, for various operations, potentially faster responsiveness for a client user. Often, the client's local copy of the information is not fully up-to-date; however, this may be acceptable as long as the currency of the copy is reasonable. A disadvantage of this approach is the typically higher network utilization required to propagate the information to the client. This is particularly prominent in cases where the client requires certain information related to the entire managed system, and where the entire system's information is large.

Some systems address the issues described above by enabling the server to propagate only changes (delta) information to each client. To that end, these systems typically maintain a queue of information changes for each client and stream (transmit) that information to the client. The disadvantage of this approach is that the queues may grow in size. Furthermore, if a client disconnects, the server may either maintain the queues in the event the case the client reconnects or eventually destroy (cancel) the queues. If a client reconnects after a long pause, and its queues were cancelled, then synchronization is of the entire information from the server to the client is required.

SUMMARY OF THE INVENTION

The present invention overcomes the disadvantages of the prior art by providing a delta query technique for transmitting only latest changes to data of objects from a server to one or more clients in response to a client query (request) to access the object data. A global counter is maintained for all of the objects served by the server. Every time the data of an object changes, a value of the global counter increments (updates) and the updated global counter value is then assumed ("inherited") by that object. In addition, the global counter is updated when a client issues a request to access one or more objects. If the data of the objects has changed since the last time the client accessed the objects, the server responds with the latest object data change and the updated global counter value. Notably, each client maintains a local counter having a value that, upon receipt of the latest object data, is modified to reflect the updated global counter value.

Broadly stated, the client issues the request to access the data of one or more objects. In response, the server scans all of the requested objects and compares their inherited counter values with the value of the client's local counter. For objects having inherited counter values that are greater than the client's local counter value, the server transmits the latest change to data of those objects to the client. However, for objects having inherited counter values that are not greater than the client's local counter value, the server need not transmit any data to the client because those objects have not changed since the last time the client accessed them, thereby signifying that the client has the latest, current data of the objects.

Advantageously, the delta query technique is simple to implement and maintain, i.e., just one global counter need be maintained on the server, which counter is updated every time the data of an object is accessed and/or changed. The novel technique further reduces consumption of server and network resources when responding to client access requests, i.e., the client only receives the changes to objects that occurred since the client last accessed the object data. Moreover, if multiple changes occurred to an object since its last access, the client only receives the latest change to the object, thereby obviating the need for the server to keep track of all changes to all objects.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
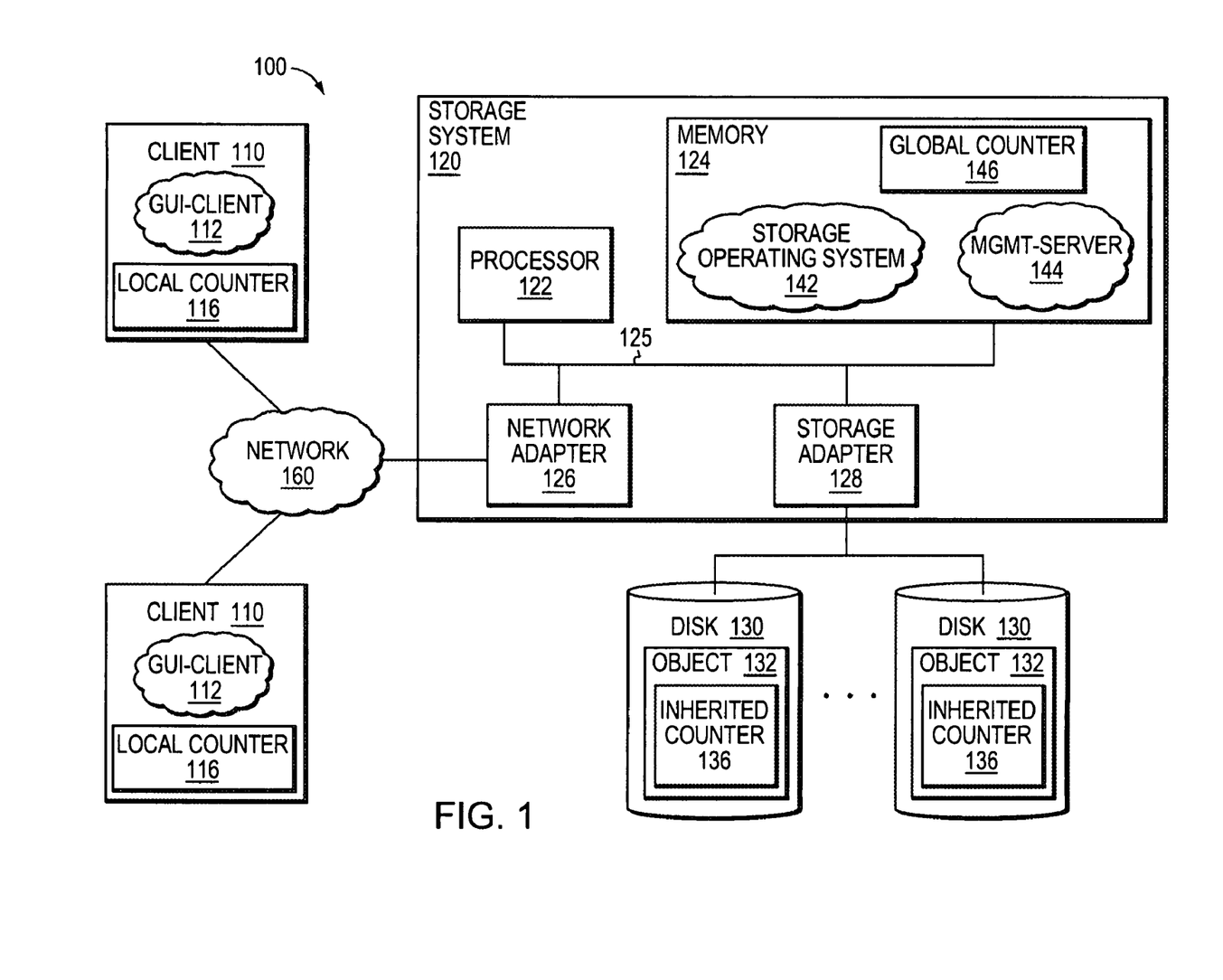
FIG. 1 is a schematic block diagram of an environment including a storage system that may be advantageously used with the present invention.

FIG. 1 is a schematic block diagram of an environment 100 including a storage system that may be advantageously used with the present invention. The storage system 120 is a computer that provides storage services relating to the organization of information on writable persistent storage devices, such as disks 130. To that end, the storage system 120 comprises a processor 122, a memory 124, a network adapter 126 and a storage adapter 128 interconnected by a system bus 125. The storage system 120 also includes a storage operating system 142 that logically organizes the information as a hierarchical structure of data containers, such as volumes, files, virtual disks, and/or logical units, on the disks 130.

As used herein, the term "storage operating system" generally refers to the computer-executable code operable on a computer to perform a storage function that manages data access and may, in the case of a storage system 120, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

The memory 124 comprises storage locations that are addressable by the processor and adapters for storing software programs and data structures associated with the embodiments described herein. The processor and adapters may, in turn, comprise processing elements and/or logic circuitry configured to execute the software programs and manipulate the data structures, such as global counter 146. The storage operating system 142, portions of which is typically resident in memory and executed by the processing elements, functionally organizes the storage system by, inter alia, invoking storage operations in support of one or more software components or processes executing on the system. These software processes may include a server (hereafter MGMT-Server 144) configured to manage and maintain up-to-date (current) information about the system. It will be apparent to those skilled in the art that other processing and memory means, including various computer readable media, may be used to store and execute program instructions pertaining to the inventive technique described herein.

The network adapter 126 comprises the mechanical, electrical and signaling circuitry needed to connect the storage system 120 to one or more clients 110 over a computer network 160, which may comprise a point-to-point link, a shared local area network, a wide area network that may span long distances or a virtual private network implemented over a public network, such as the Internet. The client 110 may be a general-purpose computer configured to execute a software component or process that functions as a graphical user interface (GUI) client (hereafter GUI-Client 112). Moreover, the client 110 may interact with the storage system 120 in accordance with a client/server model of information delivery. That is, the client may request the services of the server, and the server may return the results of the services requested by the client, by exchanging object access queries or requests over the network 160. To that end, the GUI-Client 112 may be configured to request and display information maintained by the MGMT-Server 144 to a user via, e.g., a GUI display (not shown) associated with the client 110.

The storage adapter 128 cooperates with the storage operating system 142 executing on the storage system to access information requested by the client. The information may be stored on the disks 130 or other similar media adapted to store information. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128) prior to being forwarded over the system bus 125 to the network adapter 126, where the information is formatted into an answer or response and returned to the client 110.

In an illustrative embodiment, the information maintained by the MGMT-Server 144 may be modeled as a set of objects 132, each of which contains a set of properties. An object 132 may embody any type of data container served by the storage system 120. In addition, the storage system may be illustratively configured as a storage replication system that contains a large number of objects from several object types that describe entities participating in the replication (such as servers, volumes, pairs of replication, consistency collections, etc.). As used herein, a consistency collection is defined as a set of to one or more volumes among which it is desired to maintain transaction consistency, i.e., an order of updates of a transaction to those volumes. Some of the properties of the objects describe the relationships among the objects (for example, a pair object has a property identifying to which consistency collection it is related, and another property identifying to which server its volume belongs). These properties are hereinafter denoted as structural properties. Over time, the objects served by the MGMT-Server may change; that is, objects may be added and removed from the storage system, and their structural properties may change.

The present invention is directed to a delta query technique for transmitting only latest changes to data of objects 132 from a server (such as MGMT-Server 144) to one or more clients (such as GUI-Client 112) in response to a client query (request) to access the object data. A global counter (such as global counter 146) is maintained by the server for all of the objects served by the server. Every time the data of an object changes, a value of the global counter 146 increments (updates) and the updated global counter value is then assumed ("inherited") by that object, e.g., as inherited counter 136. Note that, illustratively, the updated global counter may be inherited by an object property that was changed, i.e., two properties of the same object may have different inherited counter values because, e.g., they were changed at different times. In addition, the global counter 146 is updated when a client issues a request to access (e.g., read) one or more objects 132. If the data of the objects has changed since the last time the client accessed the objects, the server responds with the latest object data change and the updated global counter value. Notably, each client maintains a local counter 116 having a value that, upon receipt of the latest object data, is modified to reflect the updated global counter value.

Figure 2:
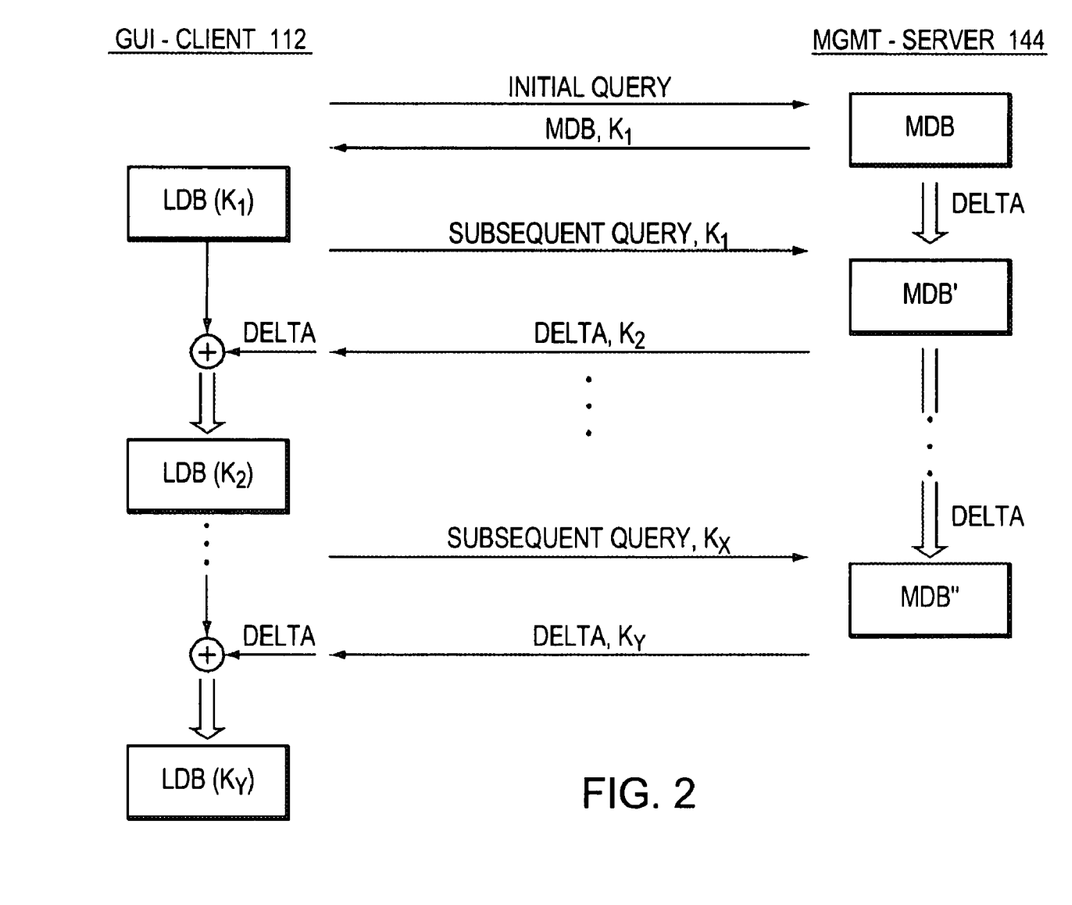
FIG. 2 is a schematic diagram illustrating an embodiment of a delta query technique in accordance with the present invention.

FIG. 2 is a schematic diagram illustrating an embodiment of the delta query technique in accordance with the present invention. Upon establishing a connection with the MGMT-Server 144, the GUI-Client 112 sends an initial query to the server and, in response, receives an image of the entire information of objects and their properties that is organized and maintained by the MGMT-Server as a server database, herein denoted MGMT-Server Database (MDB). The MDB is illustratively implemented on persistent storage, such as disks 130. In addition, the GUI-Client receives an updated global counter value or token $K_1$, which token is used to update the value of the local counter 116. Using the entire information of objects and their properties, the GUI-Client then constructs and organizes its own local copy of the information as a client database, which is herein denoted as Local Database ($K_1$), or, LDB ($K_1$). When requesting a next update is of information, the GUI-Client sends a subsequent query that includes the local counter value $K_1$. As a result, the client receives "delta" information about changes (if any) to the MDB (e.g., MDB') and a new token $K_2$. Applying the received delta information on LDB ($K_1$) results in LDB ($K_2$), which is an updated version of the information. The GUI-Client 112 can iterate this procedure, resulting in a dynamically updated version of the local information.

It should be noted that generation and receipt of a new token $K_Y$ by the MGMT-Server 144 and GUI-Client 112, respectively, does not invalidate earlier tokens $K_X(X<Y)$. An example of the usefulness of this behavior is a situation where the GUI-Client has LDB ($K_5$). The GUI-Client sends a query to the MGMT-Server and a response is not received by the GUI-Client. The GUI-Client 112 can safely retransmit the query with $K_5$. Another example involves a situation where the GUI-Client persistently maintains ("hardens") the LDB so it may restart from a failure without the need to fully synchronize the LDB. Hardening of the LDB may be accomplished "lazily", i.e., at a frequency lower than the frequency of queries. For example, suppose that the GUI-Client 112 maintains LDB ($K_{200}$) in memory and LDB ($K_{180}$) is maintained persistently, e.g., on disk. Upon a failure, the GUI-Client can resume from $K_{180}$.

As noted, the MGMT-Server 144 maintains the global counter 146. In an illustrative embodiment, the global counter 146 may be embodied as a data structure that monotonously increases by time, although it will be apparent to those skilled in the art that the counter can also be implemented as a logical timer, access counter or any other hardware and/or software entity that increases whenever a property is modified, an object is added or an object is removed, e.g., from the MDB. The value of the global counter 146 illustratively increases whenever a query request is received by the MGMT-Server 144. The value of the global counter 146 at the time of a query response is the token that is returned to the GUI-Client 112. That is, in response to a query from the GUI-Client that arrived with token $K_X$ at global counter value $K_Y$, the MGMT-Server propagates the information changed (delta) from $K_X$ to $K_Y$.

Figure 3:
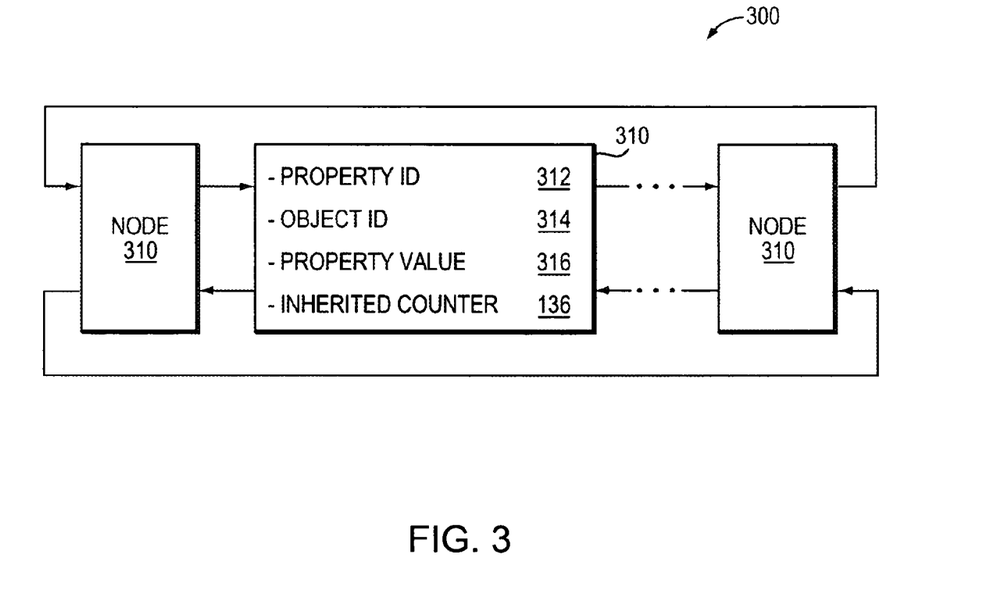
FIG. 3 is a schematic diagram of a node list that may be advantageously used with the present invention.

In an illustrative embodiment, the MGMT-Server 144 maintains a data structure, such as a list, that is configured to organize the objects 312 as a collection of nodes, external to the MDB. FIG. 3 is a schematic diagram of a node list 300 that may be advantageously used with the present invention. The list 300 is illustratively embodied as a doubly-linked list, although it will be understood to those skilled in the art that other data structures and organizational embodiments may be utilized. Each instance of a property within an object 312 is represented by a node 310 in the list 300. Each node 310 illustratively contains (i) a property identifier (ID) 312, (ii) an object ID 314, (iii) a property value 316 (or a reference to its value in the MDB) and (iv) an instance of inherited counter 136. The memory/storage required for the list 300 is illustratively bound by the number of properties, and is not related to the number of GUI-Clients 112 and/or to the interval between queries, that could be as large as needed. Bounding by number of properties is reasonable, since the MGMT-Server 144 maintains the MDB with the same order of memory/storage.

Initially, the nodes 310 may assume any arbitrary order in the list 300 and the inherited counters 136 of all nodes 310 are set to a predetermined, lowest possible global counter value such as, e.g., zero. Upon modifying an MDB property, the MGMT-Server 144 increases the inherited counter value of the node 310 and promotes that node to the "top" of the list 300. Note that this type of behavior resembles a least recently used (LRU) list structure, sorted by inherited counter value. As noted, a doubly-linked list is illustratively utilized, together with a direct reference from each MDB property to its corresponding node in the list, to thereby form an efficient-computation implementation for that process.

Whenever a GUI-Client query is received with an input token of $K_X$, the MGMT-Server 144 scans the list from its top and copies all nodes 310 to form the query answer, until it reaches a node 310 with an inherited counter value not greater than $K_X$, or until it reaches the end of the list 300. Note that it is possible that the result may contain no nodes. The token returned to the GUI-Client 112 is the global counter value at the time of the scan. Note also that, implementation-wise, this approach is computation-efficient, and is correlated with the size of information returned.

When an object is added to the MDB, the MGMT-Server 144 increases the global counter value and includes all of the object's properties with their initial values, along with the inherited counter value reflecting the global counter value at the time of the object addition, as a node 310 inserted at the top of the list 300. Note that reception of a property of an object it currently does not have in its LDB is interpreted by the GUI-Client as an act of object addition. Apart from that, other aspects are generally similar to the ones described above with respect to property modification.

Handling of object removal is generally different than handling of object addition. If the MGMT-Server 144 merely removes the corresponding property-node 310 from the list 300, the GUI-Client 112 may not be able to detect any hints for the object removal in further query answers. Therefore, an extra mechanism is used, although it should be noted that there may be other ways to handle object removal. Specifically, when an object is removed, the MGMT-Server 144 increases the value of the global counter 146 and removes all of the object's property in the corresponding node 310 from the list 300. In addition, the MGMT-Server adds the removed object ID 314, together with the value of its inherited counter 136 at the time of removal, to yet another list, called the Removed Object List (ROL).

As with the node list 300, the ROL is illustratively embodied as a doubly-linked list, although it will be understood to those skilled in the art that other data structures and organizational embodiments may be utilized. However, there is no criterion as to when the node corresponding to the removed object can be removed from the ROL. In fact, it may appear that this information should be kept indefinitely, because there may be GUI-Clients that disconnected before the object removal and may reconnect at any arbitrary point in the future. However, maintaining the ROL indefinitely violates the principle of having a bounded memory/storage—the ROL could grow if many objects are added and removed.

One solution is to maintain the ROL sorted by inherited counter value, and to bind the number of nodes in the ROL to the number of existing objects. If an object is to be added to the ROL, and the ROL is too large, the older items are truncated from the ROL. The fact that the ROL is truncated does not impact the efficiency of network utilization, because the list of existing objects is smaller than the list of removed objects that would is be returned if the ROL would be maintained indefinitely without any truncations. However, truncating of the ROL requires maintenance of another variable, called RemovalTimeGuard, which reflects the global counter value before which some object removals took place and do not appear in the ROL.

In response to receiving a GUI-Client query and in addition to the activities previously described, the MGMT-Server 144 compares the RemovalTimeGuard with the input token K. If K is greater than the RemovalTimeGuard, the MGMT-Server scans the ROL from its top, and copies its nodes to the query answer until a node with an inherited counter value smaller than K is detected, or until the ROL ends. The query answer or response is then returned to the GUI-Client 112, which removes those objects from the LDB. If K is not greater than the RemovalTimeGuard, the MGMT-Server copies the list of existing objects to the query answer, with a special indication. The answer or response is then returned to the GUI-Client, which compares the provided list with a list of objects stored in its LDB, and determines which objects should be removed from the LDB.

Figure 4:
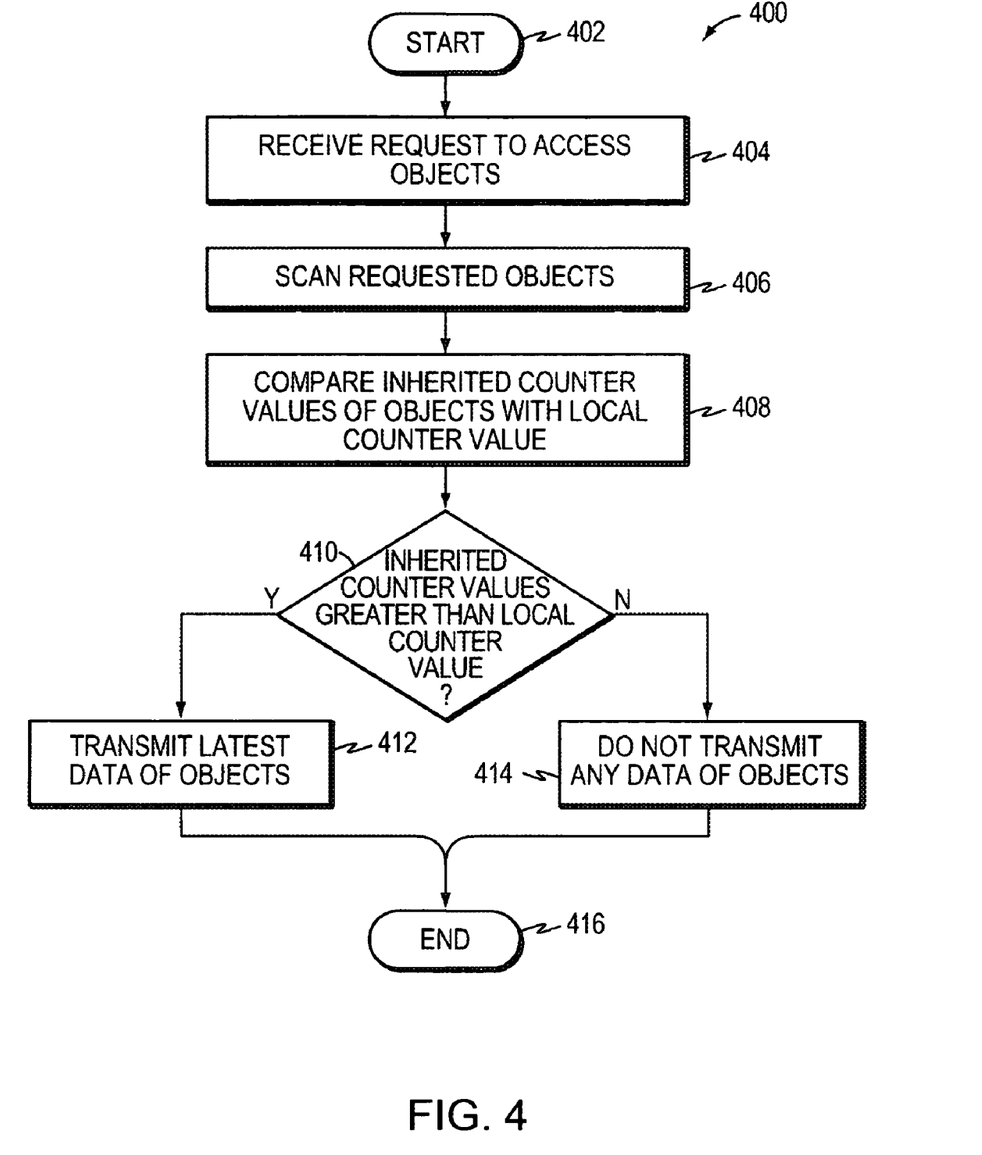
FIG. 4 is a flowchart illustrating an example procedure of the delta query technique in accordance with the present invention.

FIG. 4 is a flowchart illustrating an example procedure of the delta query technique in accordance with the present invention. The procedure 400 starts at Step 402 and proceeds to Step 404 where the server (MGMT-Server) receives a client (GUI-Client) query or request to access the data of one or more objects. In Step 406, the server scans all of the requested objects of, e.g., the node list 300 and, in Step 408, compares their inherited counter values with the value of the client's local counter. For objects-properties having inherited counter values that are greater than the client's local counter value (Step 410), the server transmits the latest change to data of those objects to the client in Step 412. However, for objects having inherited counter values that are not greater than the client's local counter value (Step 410), the server need not transmit (i.e., negates trans-mission of) any data to the client in Step 414 because those objects have not changed since the last time the client accessed them, thereby signifying that the client has the latest, current data of the objects. The procedure then ends at Step 416.

For example, assume the GUI-Client 112 issues a query (request) to access objects 1-3, wherein the request includes the value of the client's local counter (e.g., 20). Assume also that object 1 has an inherited counter value of 27, object 2 has an inherited counter value of 29, and object 3 has an inherited counter value of 35. The MGMT-Server 144 compares the value of the client's local counter with the inherited values of all the objects. Since each inherited counter value is greater than the local counter value, the MGMT-Server 144 responds to the request by transmitting the latest data change of each object to the GUI-Client 112. Subsequently, the GUI-Client 112 issues another request to access the data of the objects 1-3 (which have not changed), but this time the client's local counter value is 40. The server compares the value 40 of the local counter with the inherited values of all the objects. Since each requested object has an inherited counter value not greater than 40, the MGMT-Server 144 does not need to transmit the object data because the client has the latest data change for the object.

Advantageously, the delta query technique described herein is simple to implement and maintain, i.e., just one global counter need be maintained on the server, which counter is updated every time the data of an object is accessed and/or changed. The novel technique further reduces consumption of server and network resources when responding to client access requests, i.e., the client only receives the changes to objects that occurred since the client last accessed the object data. Moreover, if multiple changes occurred to an object since its last access, the client only receives the latest change to the object, thereby obviating the need for the server to keep track of all changes to all objects.

Specifically, the inventive technique propagates only necessary information to each client (GUI-Client) without the need for maintenance of a dynamically growing queue-of-changes per GUI-Client. The required memory/storage is bound, regardless of time passed. Propagation of the necessary information, including properties, is performed efficiently as far as the MGMT-Server and/or GUI-Client computational load is concerned, and with efficient network utilization. Note that, in an alternate illustrative embodiment, only a subset of properties may be propagated by the delta query technique described herein, with the remainder of the properties being propagated by different means.

While there have been shown and described illustrative embodiments for transmitting only latest changes to data of objects from a server to one or more clients in response to a client request to access the object data, it is to be understood that various other adaptations and modifications may be made within the spirit and scope of the present invention. For example, in alternate embodiments, the delta query technique can apply to other environments where there is a single centralized server of dynamic content of data, i.e., the data may change over time, that is periodically communicated to remote clients of the data. For example, the inventive technique can apply to an Internet site having a server that exports data, e.g., advertises products at certain prices, and a client that reflects the data exported by the server. Over time, the products and prices change such that periodically, e.g., every few seconds or minutes, the client requests a new image of the products/prices. Here, it is desirable to only send changes to the products/prices instead of all the product/price data because the latter represents a substantial amount of data.

According to the invention, the server and client may keep track of all the changes to the products/prices using the counter system according to the inventive technique. The content of the data does not need to be fully synchronized among all the clients all of the time. One or more clients may have "stale" data, e.g., in terms of time of update (10 sec. or 1 day behind) that is not being processed. When a client desires current data, it synchronizes with the server to ensure that all changes to the desired data are transmitted. Notably, the technique results in transmission of a reduced amount of data from the server to as many clients as desired, since there is no need to synchronize/coordinate communications with the clients. Each client can operate independently, as the global counter is managed in a centralized manner with respect to comparison with and updating of each client local counter.

The foregoing description has been directed to specific embodiments of this invention. It will be apparent, however, that other variations and modifications may be made to the described embodiments, with the attainment of some or all of their advantages. For instance, it is expressly contemplated that the processes and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for transmitting data, comprising:
   maintaining a global counter for a plurality of objects served by a server;
   maintaining a local counter at one or more clients;
   updating, in response to a first changing of an object by a first client of the one or more clients, a value of the global counter to a first value;
   reflecting the first value of the global counter at an inherited counter of the object, wherein the reflected first value is the global counter value at a time when the first changing occurred;
   updating, in response to a next changing of the object by a second client of the one or more clients, the value of the global counter to a next value;
   reflecting the next value of the global counter at the inherited counter of the object, wherein the reflected next value is the global counter value at a time when the next changing occurred;
   comparing a value of the local counter maintained at the first client with the reflected next value at the inherited counter of the object, wherein the value of the local counter maintained at the first client is the global counter value at the time when the first changing occurred; and
   transmitting to the first client, in response to the reflected next value at the inherited counter being greater than the value of the local counter maintained at the first client, only a latest change to data of the object since the first client last accessed the object, and in response to the first client receiving the latest change, modifying the value of the local counter maintained at the first client to the reflected next value of the global counter.

2. The method of claim 1 further comprising:
   negating transmission of any data of the object from the server to the first client in response to the reflected next value at the inherited counter not being greater than the value of the local counter maintained at the first client.

3. The method of claim 1 wherein transmitting the latest change to data of the object further comprises updating the value of the global counter.

4. The method of claim 1 further comprising:
   querying, by the first client, the server, wherein the query comprises the value of the local counter maintained at the first client; and
   scanning, by the server, in response to the query, a list and copying one or more nodes to form a query answer until the server reaches a node of the one or more nodes with an inherited counter value not greater than the local counter value maintained at the first client.

5. The method of claim 1 further comprising:
   updating the value of the global counter when the first client issues a request to access the object.

6. The method of claim 1 further comprising:
   sending an initial query from the first client to the server;
   in response, receiving, at the first client, an image of information of the plurality of objects maintained by the server; and
   receiving the reflected next value of the global counter at the first client.

7. The method of claim 6 further comprising:
   constructing a local copy of the information at the first client using the information of the plurality of objects.

8. A computer system configured to transmit data, comprising:
   a processor operatively connected to the computer system;
   a plurality of objects stored on a server;
   a local counter maintained at a first client, the local counter configured with a value that is provided in response to the first client requesting access to an object of the plurality of objects;
   a global counter maintained by the server, the global counter configured with a value that is updated by the server in response to the first client requesting access to the object;
   an inherited counter of the object, the inherited counter configured with a value that is reflective of the updated value of the global counter at a time when the first client requested access to the object;
   the server configured to compare the value of the local counter maintained at the first client with the value of the inherited counter, wherein the value of the local counter is configured with the global counter value at the time when the first client requested access to the object;
   the server further configured to transmit, in response to the value of the inherited counter being greater than the value of the local counter maintained at the first client, a latest object change to the first client, and in response to receipt of the latest object change, the value of the local counter maintained at the first client configured to inherit the value of the global counter updated by the server in response to the first client requesting access to the object.

9. The computer system of claim 8 wherein the server is a software process executing on a storage system, the server further configured to manage and maintain up-to-date information of the objects.

10. The computer system of claim 9 wherein the objects are organized and maintained as a server database.

11. The computer system of claim 8 wherein the first client is a software process executing on a general-purpose computer.

12. The computer system of claim 8 wherein the first client is configured to construct and organize the plurality of objects as a client database.

13. The computer system of claim 8 further comprising a data structure configured to organize the plurality of objects as a collection of nodes.

14. The computer system of claim 13 wherein the data structure is a doubly-linked list.

15. The computer system of claim 13 wherein one or more nodes contain a property identifier (ID), an object ID, a property value and an instance of the inherited counter value.

16. The computer system of claim 13 wherein a nodes initially assumes an arbitrary order in a list and the inherited counters of the collection of nodes are set to a predetermined global counter value.

17. The computer system of claim 16 wherein, upon modifying a property of a particular node, the server is further configured to increase the inherited counter value of the particular node and promote that particular node to a top of the list.

18. The computer system of claim 17 wherein, in response to a query from the first client comprising the value of the local counter, the server is further configured to scan the list from the top and copy one or more nodes to form a query answer until the server reaches a node with an inherited counter value not greater than the local counter value at the first client.

19. A computer apparatus, comprising:
a processor operatively connected to the computer apparatus;
means for maintaining a global counter for a plurality of objects served by a server;
means for maintaining a local counter at one or more clients
means for updating, in response to a first changing of an object by a first client of the one or more clients, a value of the global counter to a first value;
means for reflecting the first value of the global counter at an inherited counter of the object, wherein the reflected first value is the global counter value at a time when the first changing occurred;
means for updating, in response to a next changing of the object by a second client of the one or more clients, the value of the global counter to a next value;
means for reflecting the next value of the global counter t the inherited counter of the object, wherein the reflected next value is the global counter value at a time when the next changing occurred;
means for comparing a value of the local counter maintained at the first client with the reflected next value at the inherited counter of the object, wherein the value of the local counter maintained at the first client is the global counter value at the lime when the first changing occurred; and
means for transmitting to the first client, in response to the reflected next value at the inherited counter being greater than the value of the local counter maintained at the first client, only a latest change to data of the object since the first client last accessed the object, and in response to the first client receiving the latest change, means for modifying the value of the local counter maintained at the first client to the reflected next value of the global counter.

20. A computer readable medium containing executable program instructions executed by a processor, comprising:
program instructions that maintain a global counter from a plurality of objects served by a server;
program instructions that maintain a local counter at one or more clients;
program instructions that update, in response to a first changing of an object by a first client of the one or more clients, a value of the global counter to a first value;
program instructions that reflect the first value of the global counter at an inherited counter of the object, wherein the reflected first value is the global counter value at a time when the first changing occurred;
program instructions that update, in response to a next changing of the object by a second client of the one or more clients, the value of the global counter to a next value;
program instructions that reflect the next value of the global counter at the inherited counter of the object, wherein the reflected next value is the global counter value at a time when the next changing occurred;
program instructions that compare a value of the local counter maintained at the first client with the reflected next value at the inherited counter of the object, wherein the value of the local counter maintained at the first client is the global counter value at the time when the first changing occurred; and
program instructions that transmit to the first client, in response to the reflected next value at the inherited counter being greater than the value of the local counter maintained at the first client, only a latest change to data of the object since the first client last accessed the object, and in response to the first client receiving the latest change, program instructions that modify the value of the local counter maintained at the first client to the reflected next value of the global counter.

21. A method for transmitting data, comprising:
maintaining a global counter for a plurality of objects;
making, by a client, an access request to a particular object of the plurality of objects;
updating a value of the global counter in response to the access request made to the particular object;
inheriting the updated value at an inherited counter of the particular object, wherein the updated value is the global counter value at a time when the access request was performed;
maintaining a local counter at the client;
comparing a value of the local counter with the value of the inherited counter, wherein the value of the local counter is the global counter value at the time when the access request was performed; and
transmitting, in response to the value of the inherited counter being greater than the value of the local counter, only a newest change to the particular object since the client last accessed the particular object and in response to the client receiving the newest change, modifying the value of the local counter maintained at the client to the updated value of the global counter value.

22. A method for transmitting data, comprising:
maintaining a global counter for a plurality of objects;
updating a value of the global counter in response to one or more changes made to a particular object of the plurality of objects;
inheriting, by the particular object, the updated value of the global counter at an inherited counter of the particular object;

maintaining a local counter at one or more clients of a plurality of clients requesting the particular object;

comparing a value of the local counter with the value of the inherited counter, wherein the local counter value compared is the local counter value of a client requesting the particular object, and wherein the local counter value compared is the updated global counter value at a time when the client requesting the particular object last accessed the particular object;

determining, in response to the comparison, if the value of the inherited counter is greater than the local counter value of the requesting client; and transmitting to the requesting client, in response to the value of the inherited counter being greater than the local counter value, only a newest change of the one or more changes made to the particular object, and in response to the requesting client receiving the newest change, modifying the value of the local counter maintained at the requesting client to the updated value of the global counter.

23. A method, comprising:

establishing a connection with a server and one or more clients;

receiving by a client of the one or more clients, an image sent from the server of information associated with a plurality of objects, wherein the objects are organized and maintained by a database of the server;

constructing and organizing, in response to the received image, a local copy of the image in a database of the client;

maintaining a global counter value at the server associated with the image;

maintaining a local counter by the client;

sending a client query to the server, wherein the query comprises a local counter value of the local counter and wherein the local counter value is the global counter value at a time when the server receives the query;

receiving by the client, in response to the query, delta information about a newest change made to the database of the server and an updated global counter value, wherein the delta information does not include changes occurring before the newest change, and in response to the client receiving the delta information about the newest change, modifying the value of the local counter of the client to the updated global counter value; and applying the updated global counter value and the received delta information to the database of the client, wherein the delta information applied to the database of the client creates an updated version of the image sent from the server.

24. The method of claim 23 further comprising:

generating a token in response to the newest change made to the database of the server and sending the token to the client; and receiving the token from the server.

25. The method of claim 24 wherein generation and receipt of the token by the server and the client, respectively, does not invalidate an earlier token.

26. The method of claim 23 further comprising using an object removal list in conjunction with a variable, where the variable does not appear in the object removal list and reflects the global counter value of an object of the plurality of objects before a removal of the object has taken place.

* * * * *

UNITED STATES PATENT AND TRADEMARK OFFICE
CERTIFICATE OF CORRECTION

| | | |
|---|---|---|
| PATENT NO. | : 7,693,886 B1 | Page 1 of 2 |
| APPLICATION NO. | : 11/640019 | |
| DATED | : April 6, 2010 | |
| INVENTOR(S) | : Yoram Novick | |

It is certified that error appears in the above-identified patent and that said Letters Patent is hereby corrected as shown below:

In the Specifications:

Col. 1, Line 57, please amend as shown:
tion to be current, such that if new objects are [[is]] added (e.g., Col. 2, Line 34, please amend as shown:
synchronization [[is]] of the entire information from the server to Col. 4, Line 67, please amend as shown:
set of [[to]] one or more volumes among which it is desired to

Col. 5, Line 48, please amend as shown:
LDB ($K_1$). When requesting a next update [[is]] of information, Col. 7, Line 39, please amend as shown:
objects that would [[is]] be returned if the ROL would be main Col. 8, Line 7, please amend as shown:
transmit (i.e., negates trans[[-]]mission of) any data to the client Signed and Sealed this Twenty-fifth Day of May, 2010

David J. Kappos
*Director of the United States Patent and Trademark Office*

In the Claims:

Col. 10, Line 54, please amend as shown:
 when the first client requested access to the object; and Col. 11, Line 17, please amend as shown:
 16. The computer system of claim 13 where a node[[s]]

Col. 11, Line 39, please amend as shown:
 ents;

Col. 11, Line 50, please amend as shown:
 means for reflecting the next value of the global counter [[t]]at Col. 11, Line 58, please amend as shown:
 global counter value at the [[lime]]time when the first changing Col. 12, Line 3, please amend as shown:
 program instructions that maintain a global counter [[from]]for a